United States Patent [19]

Picard et al.

[11] Patent Number: 4,708,251

[45] Date of Patent: Nov. 24, 1987

[54] METHOD AND APPARATUS FOR REMOVING A CRASHED AIRCRAFT

[75] Inventors: Didier Picard; Pierre Roblin, both of Paris, France

[73] Assignee: Soudure et Mechanique Appliquees Du Val Notre-Dame, Argenteuil, France

[21] Appl. No.: 829,865

[22] Filed: Feb. 18, 1986

Related U.S. Application Data

[63] Continuation-in-part of Ser. No. 535,311, Sep. 23, 1983, abandoned.

[30] Foreign Application Priority Data

Apr. 26, 1983 [FR] France .................................. 83 06858

[51] Int. Cl.⁴ ............................................. B66C 23/26
[52] U.S. Cl. .................................... 212/182; 212/186; 212/187; 254/325; 254/326; 414/460
[58] Field of Search .................... 212/182, 186–188, 212/218; 254/324–326, 328; 414/459–461; 180/208, 210, 212, 215

[56] References Cited

U.S. PATENT DOCUMENTS

| 1,109,148 | 9/1914 | Rudd et al. | 212/188 |
| 2,191,181 | 2/1940 | Rogers | 212/187 |
| 2,598,517 | 5/1952 | Drott | 254/325 |
| 4,262,812 | 4/1981 | Bremenkamp | 414/460 |

FOREIGN PATENT DOCUMENTS

| 501030 | 6/1930 | Fed. Rep. of Germany | 254/326 |
| 681430 | 9/1939 | Fed. Rep. of Germany | 414/460 |
| 854422 | 7/1949 | Fed. Rep. of Germany | 212/182 |
| 2716142 | 4/1978 | Fed. Rep. of Germany | 414/460 |
| 266166 | 7/1964 | Netherlands | 254/326 |
| 793907 | 1/1981 | U.S.S.R. | 414/460 |

Primary Examiner—Jeffrey V. Nase
Assistant Examiner—R. B. Johnson
Attorney, Agent, or Firm—Birch, Stewart, Kolasch & Birch

[57] ABSTRACT

Crane for lifting and removing aircraft wreckage that is immobilized on a landing strip. Two twin beams are provided bevel-hinged at one of their ends. A gantry including legs which are affixed to the free ends of the beams. The gantry is shaped like an inverted V, with the two legs which are capable of being joined by their upper ends. The feet of the gantry have joints whose pins are parallel to the direction passing through said two feet.

5 Claims, 8 Drawing Figures

METHOD AND APPARATUS FOR REMOVING A CRASHED AIRCRAFT

This application is a continuation-in-part of application Ser. No. 535,311 filed on Sept. 23, 1983, now abandoned.

BACKGROUND OF THE INVENTION

1. Field of the Invention

The present invention relates to a method and apparatus for removing the wreckage of an airplane.

2. Description of Background Art

The removal of the wreckage of an airplane from a landing strip after a crash usually occurs by means of relatively conventional cargo-handling equipment.

Sometimes, a crane-type machine is installed temporarily beside the wreckage in order to lift it. The wreckage is then positioned on a platform which, for its part, is equipped to receive the wreckage and to permit it to be subsequently removed.

Sometimes, a gantry-type timber logging machine having a support in the form of a gantry is brought above the wreck. The airplane wreckage may be carried away after it has been hoisted under the gantry.

SUMMARY AND OBJECTS OF THE INVENTION

The present invention relates to the gantry-type of apparatus which has the following advantages over the crane-type of mechanism. First, it permits fast removals because it is not necessary, under relatively difficult conditions, to proceed with the installation of a lifting gear beside the wreck. Indeed, the gantry-type machine only has to be delivered on site and assembled in order to be able to hoist the wreck and carry it away, whereby nonproductive time is reduced to a minimum.

Second, the gantry-type machine permits careful transporting of the wreckage. Indeed, it is difficult to not mishandle the geometry and components of a crashed plane especially when the plane is lifted and deposited on a platform in a hurry. The wreckage should be preserved in its entirety as much as possible in order to restore it to its original state. The price of a military plane, for example, costs in the neighborhood of several tens of millions of dollars.

In the gantry-type machine, a conventional machine is known wherein the gantry is in the form of an inverted V fixed by its legs to the ends of the branches of a drawbar which is also V-shaped. This unit presents itself in the form of two V's, one horizontal and the other substantially vertical, connected by the ends of their branches slightly above ground level and comprising wheels or sets of wheels in the connection zones.

This machine is of simple construction in order to minimize its production cost, so that a vast number of airports can be equipped therewith. The machine presents itself tridimensionally in the form of a tetrahedron with two opposed edges missing. One horizontal edge is provided to permit engagement of the wreck under the inverted-V-type gantry.

This unit is capable of being dismantled in order to be quickly transported by air and reassembled at an airport that does not have such removal gear.

Therefore, the object of the present invention is to solve the problem of dismantling and reassembly involving a double immobilization, in time and in operations. This immobilization can become critical since, for obvious reasons of economy, it is not possible, in practice, to equip all airports with machines that are, after all, expensive and are used only in exceptional cases.

The ideas on which the present invention is based consists in avoiding, strictly speaking, any dismantling of the machine so as to make it transportable. Instead of dismantling, the present invention simply folds back so that, after transport and once on the site, it can be deployed almost instantaneously. Therefore, even an airport that has absolutely no landing-strip clearing equipment can be put back into service in record time, within an hour, since the machine of the present invention can be airlifted and made operational immediately.

The structure of the present invention is capable of being alternately folded and deployed. A gantry-type double-V type machine referred to above includes four branches forming V's (i.e., a V of the drawbar and a V of the gantry) which are almost of equal length. Thus, it is possible to contemplate pulling the V's up one against the other like the legs of a compass or the ribs of an umbrella.

Nevertheless, in order to enable the unit to fold up, each of the four branches must be pivoted at its ends on its neighbor. Thus, it seems difficult to make a structure that can be folded up with the degrees of suitable freedom to the extent that each of the four V's formed by two consecutive adjacent branches must be capable of folding up in the manner of a compass.

Now, such a structure is available by coordinating the articulation of one branch on the other of the two different V's like the legs of a compass through an assembly which enables the two V's to spread out in the form of a gantry and a drawbar. The four branches may be folded up one against the other so as to form a unit in the shape of a cigar capable of being readily transported in the fuselage of a cargo plane which can be opened through the nose.

BRIEF DESCRIPTION OF THE DRAWINGS

The invention will be better understood from the following description taken in connection with the accompanying drawings in which a specific embodiment has been set forth by way of non-limitative example. In the drawings.

DETAILED DESCRIPTION OF THE IMVENTION

Figure 3:
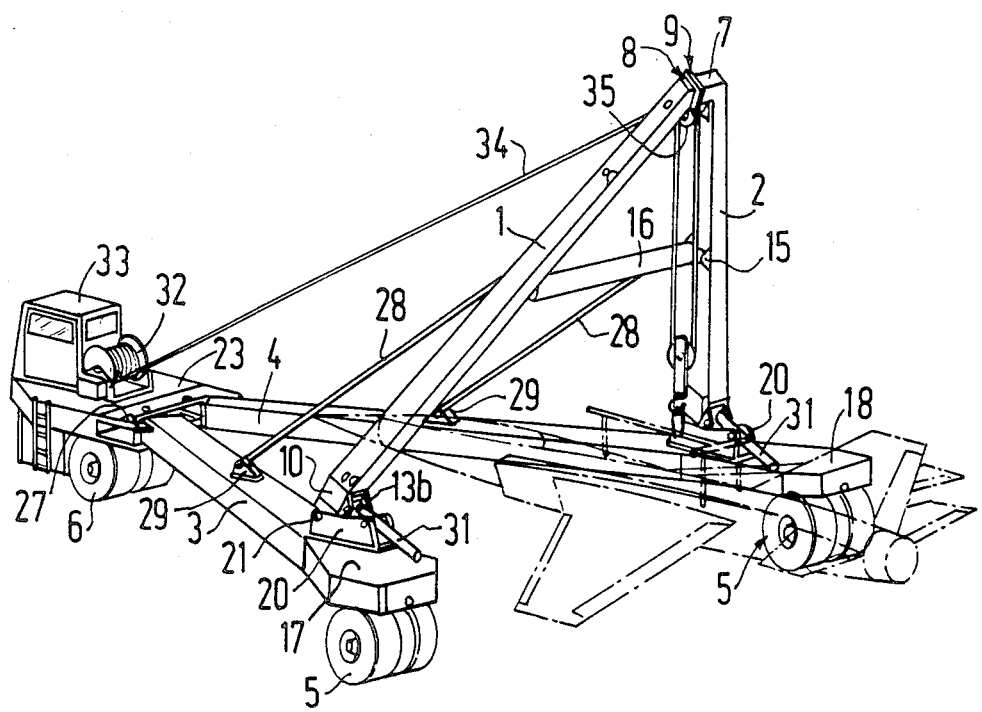
FIG. 3 is a view according to the same perspective of the machine fully spread out in its working configuration.

Referring to FIG. 3, one recognizes immediately the conventional tetrahedron structure mentioned above in the introduction. This structure comprises: a gantry in the form of an inverted V made up of two legs 1 and 2 joined together by their tops, and a V-shaped drawbar having branches 3 and 4. The branches 3 and 4, at the free ends thereof, support the legs 1 and 2 and are joined together at the opposite ends as shown in the left side of FIG. 3. It is readily apparent that the tetrahedron which is defined by the two legs and the two branches does not have a horizontal edge between their common ends so that it is possible to engage and to suspend a wreck beneath the top of the inverted-V gantry 1, 2.

The unit is supported by three sets of wheels, a set 5 being mounted under each platform at the free ends of the branches 3 and 4 adjacent to the legs 1 and 2 and a set 6 being mounted beneath the platform that joins together the branches 3 and 4. The unit can be positioned very close to the wreckage and be engaged on both sides thereof by means of the wheels 5. In this manner the unit may be positioned so that the wreckage can be hoisted.

A detailed description will now be given as to how the legs 1, 2 and branches 3, 4 of the unit illustrated in FIG. 3 may be brought together to form the cigar-shaped unit shown in FIG. 5.

Figure 1:
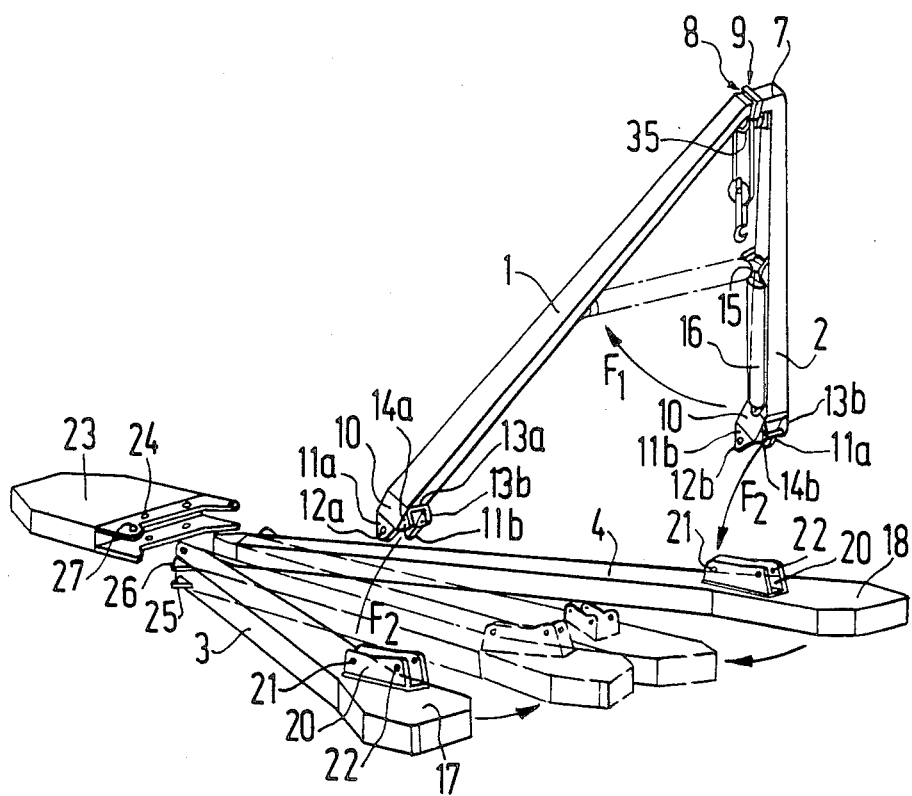
FIG. 1 is a perspective view of the basic design of the improved gantry-type machine illustrating the manner in which the gantry legs are kept apart, and in chain-dotted line, the manner in which the branches of the drawbar can be folded up.

Referring to FIG. 1, essentially the same structural elements of the machine of FIG. 3 are illustrated. In the interest of clarity, the elements have been shown without the sets of wheels in order to permit an understanding of how they are hinged to one another.

Figure 4:
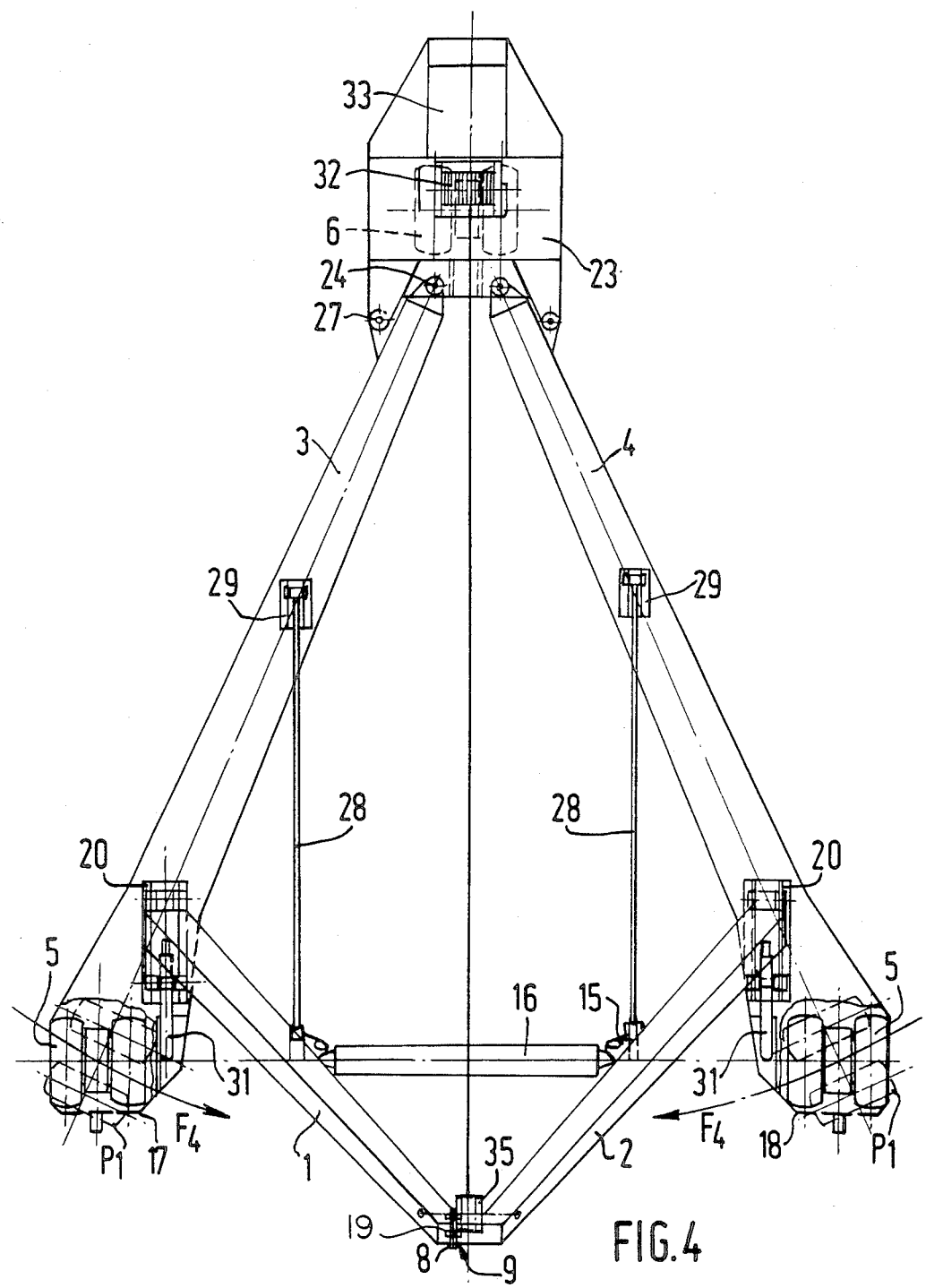
FIG. 4 is a top view of the machine spread out in its working configuration, with parts partially broken away, above the sets of wheels.

Particularly visible are the legs 1 and 2 constructed in the form of quadrilateral beams and joined at their apex. At the apex the leg 2 is provided with a bent portion 7 at its upper end, also visible in FIG. 4. Thus, the two apexes are detachably bolted by means of bolts 19 connecting flanges 8 and 9 provided on the two legs as shown in FIG. 4.

At the other end, each of the legs has a double pair of lugs arranged on a cubic caisson 10 whose orientation is askew relative to that of the leg. This skewness of orientation, which is clearly visible in FIG. 4, will be discussed below.

A first pair of side lugs 11a and 11b are provided adjacent the other end on the extension of the side faces of the cubic caisson 10. The lugs 11a, 11b are pierced by holes 12a and 12b for receiving a pin.

Likewise, two lugs 13a and 13b are provided outside the plane of the V which is formed by the two legs. The lugs 13a and 13b are formed on the extension of the side faces of the cubic caisson 10. The lugs 13a, 13b are pierced by holes 14a and 14b, which are likewise provided for receiving a pin.

The lugs 11a, 11b and 13a, 13b are tied to the branches 3 and 4 of the V-shaped drawbar. The legs 1, 2 have, respectively, at mid-height and inwardly, another pair of lugs 15. The lugs 15 are provided for the positioning of a spacing member 16 shown in its rest position along the leg 2. The spacing member 16 is secured by tying its two ends by means of conventional pegs. When the spacing member 16 is raised in the direction of the arrow F1, and then secured to the lug 15 provided on leg 1, then the legs 1, 2 and the spacing member 16 form a V which is so perfectly locked in position that the distance between the lower ends of the legs 1 and 2 is perfectly fixed.

The drawbar formed by the branches 3 and 4 will now be described in detail.

The branches 3, 4 are likewise formed by quadrilateral beams, but they terminate in platforms 17 and 18 on which fork joints 20 are fixed. Holes 21 and 22 are provided in the upper part of the lugs of the fork joints 20.

The branches 3 and 4 are mounted such as to pivot horizontally on a platform 23 through pins engaged in holes 24. Lugs 25 and holes 26 enable the branches 3 and 4 to be locked in a spread position so that, when the spacing member 16 is in place, the lugs 11a, 11b provided on the lower ends of the legs 1 and 2 engage with precision in the direction of arrows F2 in FIG. 1 in the fork joints 20 positioned on branches 3 and 4. Branches 3 and 4 are locked in position by means of pegs not shown, which are engaged both in holes 27 provided on platform 23 and in holes 26 of lugs 25.

The conditions for affixing the V-shaped gantry to the V-shaped drawbar will now be described.

Referring to FIG. 4, it will be seen that the lugs of the fork joints 20 are parallel to one another in the spread position of the branches 3 and 4. In this position the pegs are engaged in both the holes 27 of the platform 23 and in the holes 26 of the lugs 25 provided on the ends of the branches 3 and 4.

Figure 2:
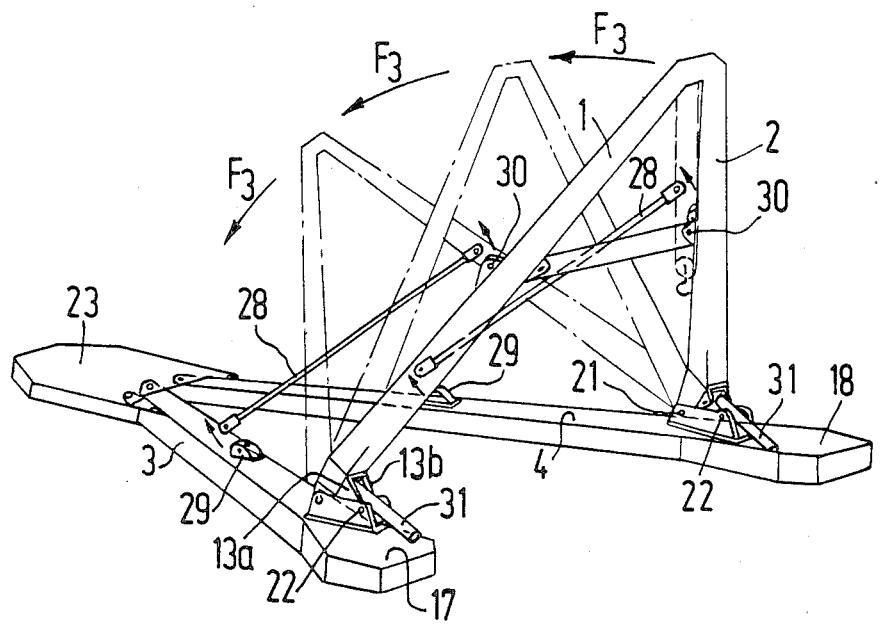
FIG. 2 is a schematic view according to the same perspective as FIG. 1, but showing the possibilities of turning down the legs of the gantry against the branches of the drawbar.

Therefore, if the lugs 11a and 11b, provided on the lower portions of the legs 1 and 2, respectively, which are parallel to each other, engage the lugs of the fork joints 20, it will be possible to rotate the inverted-V-shaped gantry 1, 2 in the direction of the arrows F3 as shown in FIG. 2. Likewise, it will be possible to place the gantry in any intermediate rotated position or to lock it in the position shown in FIG. 3 and in the position indicated by a solid line in FIG. 2, which is its working position. For this purpose, it suffices to position two tie rods 28 tied, respectively, to the gantry and to the drawbar by fork joints 29 and 30.

The gantry can be lifted by jacks 31 mounted on pins positioned through the housing of the jacks. The pins pass through the holes 22 made in the fork joints 20 and are affixed by the end of the projecting rod passing through the jacks to the lugs 13a, 13b by means of pins engaged in the holes 14a, 14b.

The gantry-type unit is completed by a winch 32 operated from a cabin 33 and controlling a hoisting cable 34 which passes on a return pulley 35 as illustrated in FIG. 4.

Figure 5:
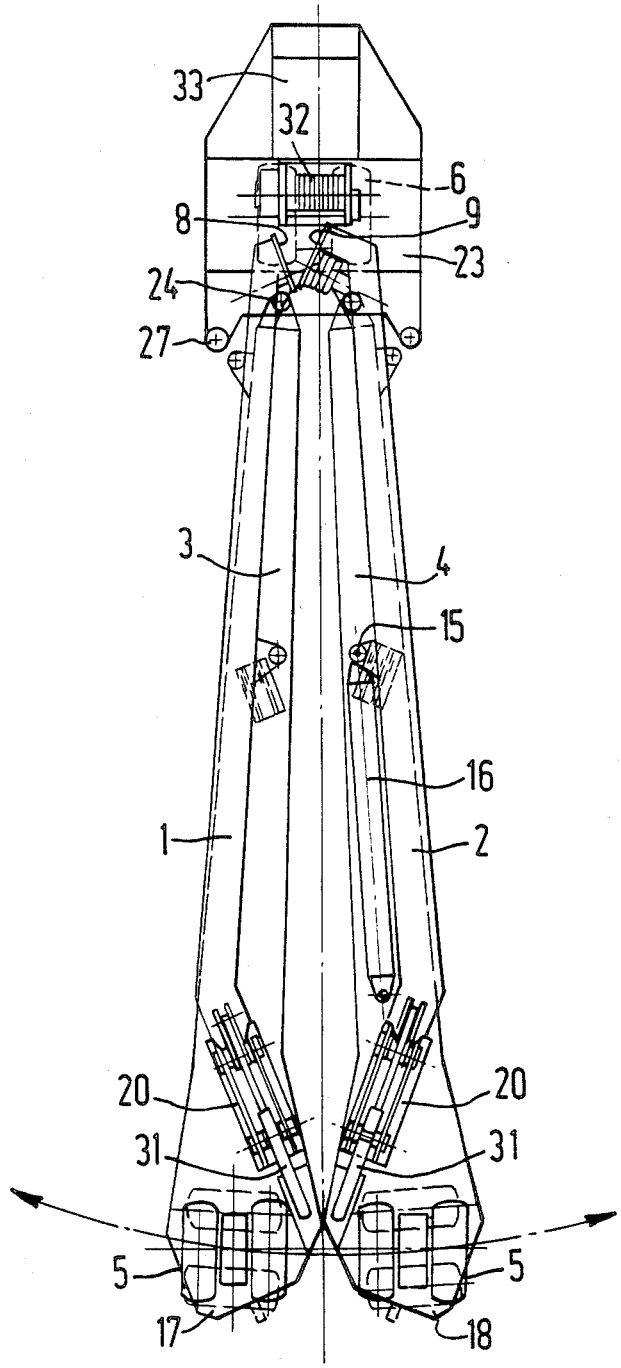
FIG. 5 is a top view of the same machine, but in its folded-up position for transportation.
Figure 7:
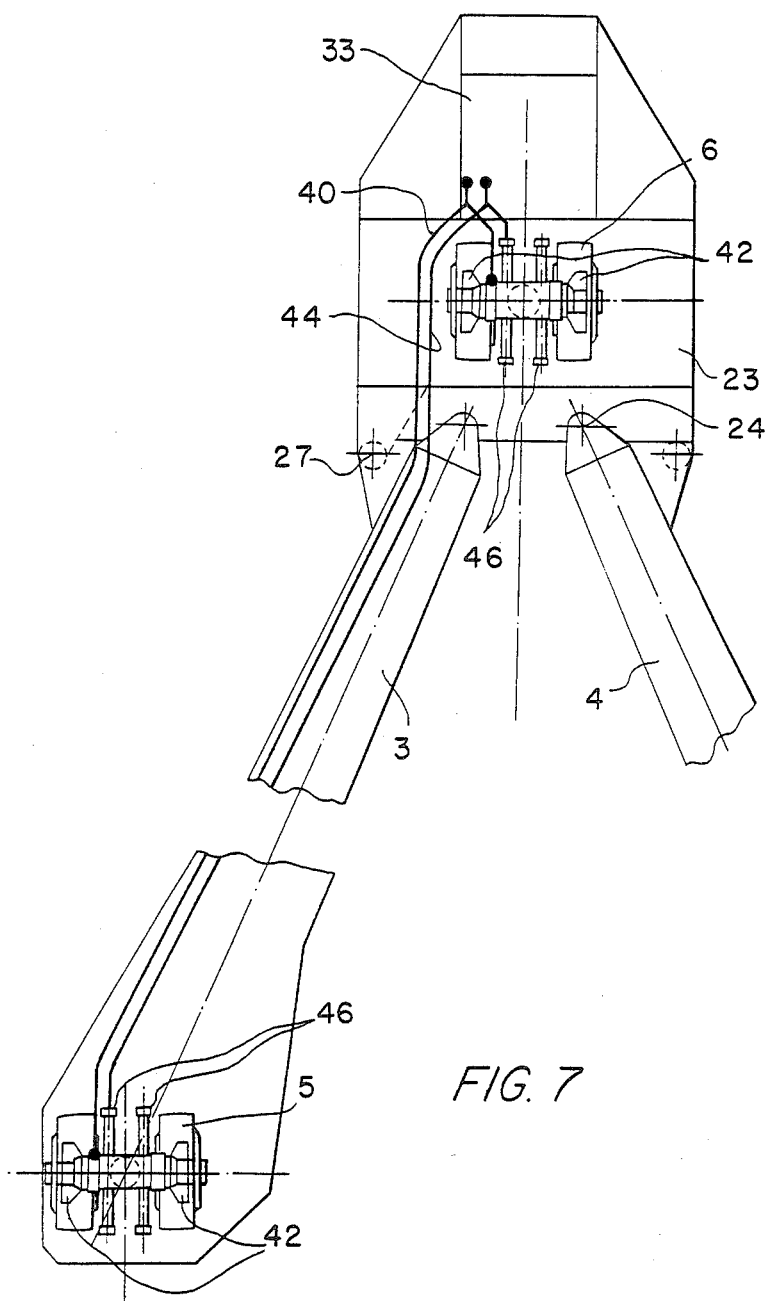
FIG. 7 is an enlarged view of a portion of FIG. 4 showing the drive means and steering means of the wheels.

Referring to FIGS. 1 and 5, it will be seen that the two branches 3 and 4 of the V-shaped drawbar can be brought together by pivoting about pins engaged in the holes 24 of the platform 23. This pivoting can be accomplished in a conventional manner by arranging the sets of wheels 5 and 6 so that they can pivot on vertical pins which can also be positioned in a tangential orientation P1 as shown in FIG. 4. Therefore, it suffices to have these wheels individually motor driven so as to bring the branches 3 and 4 closer together or to separate them in the direction of arrows F4. FIG. 7 shows hydraulic or electrical lines 40 which are connected to wheel driving means 42 and hydraulic or electrical lines 44 connected to wheel steering means 46 in order to provide rotation and steering of wheels 6.

Figure 6:
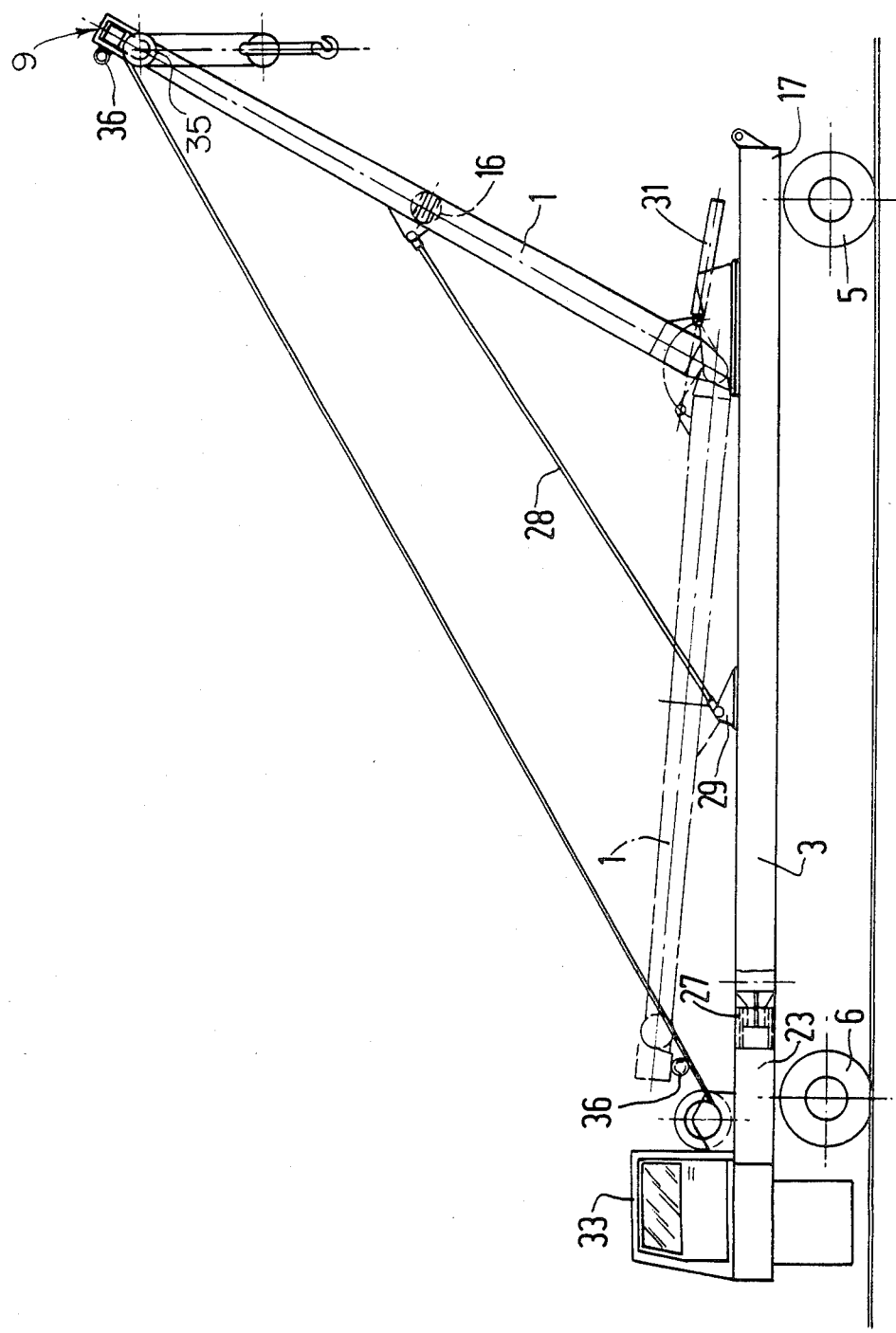
FIG. 6 is a side view of the machine of FIG. 4 in its working configuration illustrating, in chain-dotted line, the gantry which is turned down into the position for transportation.

As illustrated in FIG. 5, the flanges 8 and 9, provided on the upper part of the legs 1 and 2, are shown in a disconnected condition as is the spacing member 16. In operation legs 1 and 2 form a rigid V-shaped configuration because of their connected flanges 8 and 9. If it is desired to bring the branches 3 and 4 together, it will be necessary to disconnect flange 8 from flange 9 so that gantry legs 1 and 2 may move toward each other. The disconnecting operation of the flanges 8 and 9 is accomplished after the gantry has been rotated horizontally onto the platform 23, and rests on the platform through shims 36 provided on legs 1 and 2, as illustrated in FIG. 6. The rotation is, in the direction of arrows F3 illustrated in FIG. 2. Once this operation is completed, it is then possible to reclose the two branches 3 and 4 against each other. The legs 1 and 2 rest above the branches and are prevented from rotating about vertical axes with respect to the branches by the rotary joints 20, 11a, 11b so that the legs are automatically brought together upon movement of the branches and the flanges 8 and 9 are separated from one another, as illustrated in FIG. 5.

In the configuration shown in FIG. 5, it is readily apparent that the machine is completely folded up and that it presents itself in the form of a vehicle having the form of a long cigar supported by three sets of pivotable wheels.

Thus, it can be transported on the road by itself with a small loading gage. It can also be engaged in a jumbo jet, since it can easily enter and be accommodated in a fuselage that can be opened through the nose.

It will be noted that the necessary pivotable wheels on the ends of the branches 3 and 4 permit fine adjustments by permitting the gantry-type unit to be positioned adjacent to a wreckage for loading.

Figure 8:
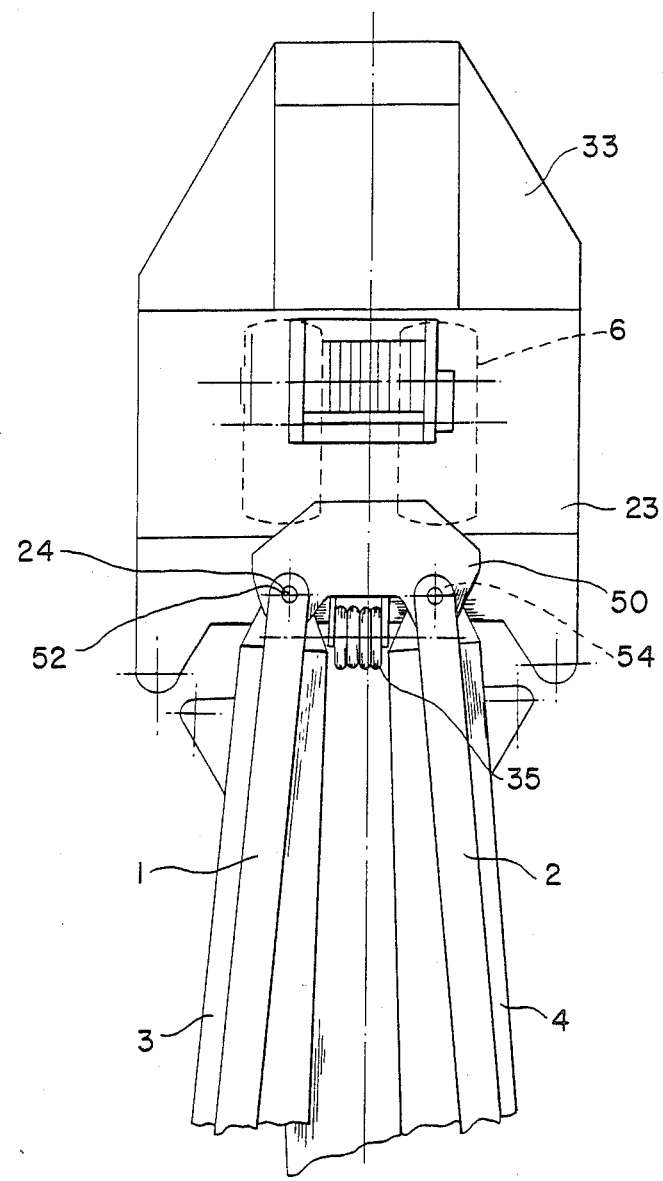
FIG. 8 is an enlarged view of the upper part of FIG. 4 showing a different embodiment of the leg attachment arrangement.

Referring to FIG. 8, it will be noted that instead of providing detachably bolted flanges between the legs 1 and 2, one could also hinge one of the legs 1 or 2 to the other in the form of a two-leg compass either directly or indirectly as shown in FIG. 8, by having leg 1 hinged at 52, for example, and leg 2 hinged at 54 to the member 50. The hinges 42 and 54 are located above the holes 24 so that the compass formed by the legs 1 and 2 is the same type as that formed between the branches 3 and 4.

In such an embodiment, when the gantry is rotated horizontally, as illustrated in FIGS. 5 and 6, the legs 1 and 2 can be brought against each other at the same time as the branches 3 and 4 without requiring the two legs 1 and 2 to be disconnected at their apexes, since the legs of the compass enable the unit to move so that the legs 1 and 2 are brought together.

Therefore, the spread movement of the machine from the position shown in FIG. 5 can be made entirely on the site by simply increasing the distance between the branches 3 and 4 and simultaneously lifting the gantry with the jacks 31.

The unit is then spread out in its entirety under conditions that will allow it to be used on the ground almost immediately.

It will be noted that the linkage system made up of the legs 1, 2 and branches 3, 4, when folded up as shown in FIG. 5, presents itself in a configuration which is exactly the same as the folded-up legs of a grasshopper of a locust. However, the linkage system is spread out in a completely different manner because of the organization of the joints between the four "sides" of the tridimensional articulated quadrilateral 1, 2, 3, 4. This observation is important because it brings out the very peculiar and, thus, the original, character of the four joints or couplings in this application which are specially organized between the four elements 1, 2, 3 and 4.

This analysis also permits one to understand exactly how the choice of this special arrangement, among all the various combinations including the one cited with regard to the legs of the locust, makes it possible to solve the problem of the folding-up of a bulky machine of the gantry-type to which reference is made in the preamble to the present description.

While a particular embodiment has been shown and described herein, it will be understood, of course, that the invention is not limited thereto since many modifications may be made, and it is, therefore, contemplated to cover by the appended claims any such modifications as fall within the true spirit and scope of the invention.

We claim:

1. A crane for lifting and removing airplane wrecks, comprising in combination:
   a drawbar including a pair of beams connected together at first respective longitudinal ends thereof by first hinge means for pivoting each said beam about an axis which is vertical in use;
   a gantry including a pair of legs, connecting means connecting said pair of legs together at one end thereof and allowing said legs to be alternately spread apart and pulled together, said pair of legs connected at their opposite ends respectively by second hinge means to second longitudinal ends of said beams;
   first, second and third sets of wheels connected to the drawbar and each set being located respectively adjacent one of said first and second hinge means, said first and second sets of wheels being provided adjacent said second hinge means, steering means located at each of said first, second and third sets of wheels for independently steering each of said sets of wheels, removable spacing means for locking said legs and said beams into respective V-shaped predetermined configurations, said legs forming at their connection a gantry apex in such a configuration, said removable spacing means being arranged when operative to permit engagement of the wreck under said gantry between said beams;
   removable locking means adapted to maintain said gantry in a predetermined working position with respect to said drawbar;
   hoisting means provided at said gantry apex;
   a lifting jack provided between each said leg and the underlying said beam;
   a platform provided above said third set of wheels;
   said first hinge means being arranged between each said beam and said platform;
   a cabin and a winch located on said platform and a hoisting cable connecting said winch to said hoisting means, and
   said second hinge means being arranged for pivoting said legs about a common horizontal transverse axis at least when said legs and said beams are in said predetermined V-shaped configuration from said working position to a folded-up position where said legs rest respectively upon said beams.

2. The crane as defined in claim 1, wherein said pair of legs have substantially the same length as said pair of beams.

3. The crane as defined in claim 1, wherein said sets of wheels are motor-driven.

4. A crane as defined in claim 1, wherein the hoisting means comprises a return pulley for the hoisting cable and said winch, the latter being positioned in the region of said first hinge means.

5. A crane as defined in claim 1, wherein the removable spacing means includes a spacing member secured between said legs and positioned approximately at half height of said legs so that space is provided under said gantry between said beams.

* * * * *